March 25, 1924.
H. P. MACDONALD
1,488,128
JUNCTION OF METAL PARTS AND THE ART OF JOINING SUCH PARTS
Filed Jan. 30, 1919
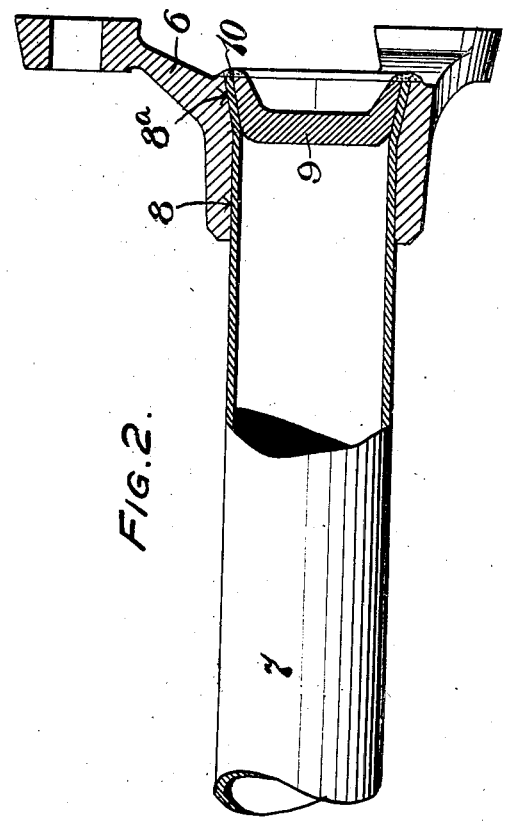
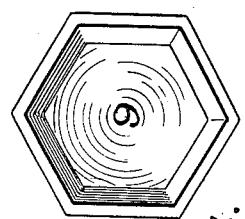
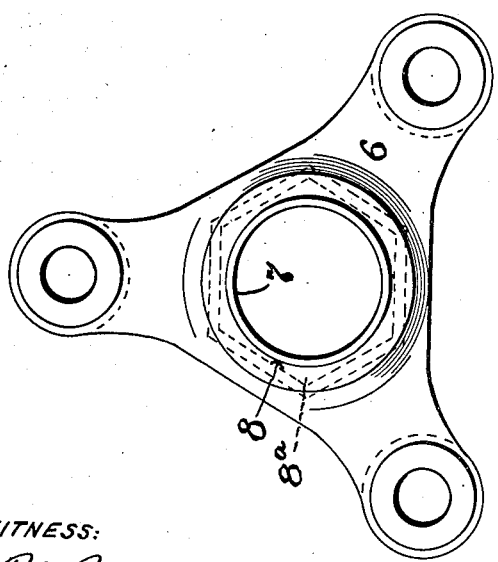
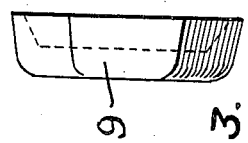
WITNESS:
INVENTOR
Harry P. Macdonald
BY
ATTORNEYS.

Patented Mar. 25, 1924.

1,488,128

UNITED STATES PATENT OFFICE.

HARRY P. MACDONALD, OF MONTCLAIR, NEW JERSEY, ASSIGNOR TO THE SNEAD & CO. IRON WORKS, OF JERSEY CITY, NEW JERSEY, A CORPORATION OF NEW JERSEY.

JUNCTION OF METAL PARTS AND THE ART OF JOINING SUCH PARTS.

Application filed January 30, 1919. Serial No. 273,974.

*To all whom it may concern:*

Be it known that I, HARRY P. MACDONALD, a citizen of the United States, residing at Montclair, county of Essex, and State of New Jersey, have invented certain new and useful Improvements in Junctions of Metal Parts and the Art of Joining Such Parts, of which the following is a specification.

This invention relates to the art of joining metal parts, and particularly, to the joining of tubing to metal parts, especially for purposes of torque transmission.

Steel tubing is now being used to take the place of solid metal shafts, bars, and the like, in machine or other parts, owing to its lightness and greater rigidity pound for pound; but there has been considerable difficulty encountered in properly securing the tubing to the adjacent metal parts owing to the fact that the walls of the tubing being thin, the usual keys or pins cannot be employed. It is one of the chief objects of my invention to overcome these difficulties, and to provide a simple and inexpensive joint which is not only rigid but also considerably stronger than the keyed or pinned joints described. I accomplish the foregoing by means of a process and construction illustrated in preferred form in the accompanying drawings, wherein:—

Figure 1 is an end elevation of a section of steel tubing joined to a hollow metal part, such for example, as a flange or three armed spider; Figure 2 is a partial side elevation of a section of Fig. 1; Figure 3 is a side elevation of an expanding wedge or block utilized in carrying out my invention; and Figure 4 is an end view of the block shown in Fig. 3.

In carrying out my invention as here illustrated, I provide the flange, spider, or other part 6 to which the tubing 7 is to be joined with an aperture or hole 8, preferably machined, the diameter of which is slightly smaller than the outside diameter of the tube at its front end. The rear end 8ª of the aperture or opening, however, instead of being circular, is given an irregular shape having a diameter or cross dimension slightly greater than the outside diameter of the tube. In the drawings I have shown this portion of the opening to be flaringly enlarged, and hexagonal, but any other shape, suitable to obtain the desired results, may be employed.

The metal part 6 is now heated so as to cause it to expand sufficiently to permit of its being slipped over the end of the tube, the part shrinking fast onto the tube when it has cooled. However, before the cooling has been completed, the inner end of the tube is heated, as for example, by means of an acetylene torch or other device, and the hexagonal plug or wedge 9, or other desired shape corresponding in outline to the shape of the rear end of the hole in the metal part 6, is forced into the tube, thereby expanding the tube through and from its open end (and that of the part 6) progressively inward, and forcing it tightly in such enlarged portion of the hole in anti-turning conformity thereto. This plug or wedge may be allowed to remain in the tube, and the inner end of the tube, the metal part 6, and the wedge all welded together by means of a suitable torch, electric arc welder or other device. This welding I have roughly designated at 10 in Fig. 2.

From the foregoing it will be seen that any stress on the tube is taken up by the flange or other metal part through the friction between the tubing and such part, owing to the shrinkage of the part on the tube, by the expanded portion of the tube formed by the wedge, and lastly, by the holding effect of the welding of the three parts together. Even aside from the weld, the integral hollow part or member 6 and the tube 7 have a double torque-transmitting relation or engagement on the one hand, by virtue of the torque-transmitting intimacy of contact between their round surfaces due to the tight fit of the tube with the cylindrical portion 8 of the part 6; and on the other hand by virtue of the more positive anti-turning engagement of the deformed tube wall with the positive, " eccentric " anti-turning engagement means at the portion 8ª. The tight internal plug member 9 sustains or holds the tube wall up to a tight fit with both of these portions 8 and 8ª, thus maintaining the double engagement most effectually. Indeed, the tube wall is tightly wedged or gripped between the cooperating external and internal members 6 and 9, by virtue of the force exerted to bring about their relative movement in the axial direction of the tube when the member 9 is being fitted. The cylindrically round portion 8 of the hollow member 6 serves to align the tube 7 definitely and accurately with said member, which is of advantage when the member 9 is being forced home to crowd the tube wall against the interior of the member 6, as well as afterward. In the completed joint, as already mentioned, the tube has external projections engaged in the non-concentric recesses at the corners of the polygonally enlarged opening 8ª.

I am aware that it has been common practice to make connections between a metal flange or other part and a tube by either shrinking the flange on the tube or forcing it on, and then welding the flange and the tube together both at the inner and at the outer end. The objection to this process lies in the fact that the welding of the parts together injures the metal, owing to the excessive heat required, and renders it liable to crystallization under repeated shocks or alternating stresses, such as take place, for example, in the moving parts of the mechanism of an automobile. It is also not practicable to depend entirely upon the holding power of a shrink fit, owing to the fact that the thin wall of the tubing is readily compressed and consequently the full value of the shrinkage pressure is not realized. In the construction here illustrated, on the other hand, the injurious effect of the welding process is localized only at the extreme end of the tube, and the main stresses are taken up by the shrinkage friction at and adjacent the portion more directly sustained by the wedge or plug member 9, and by the more positive anti-turning engagement at this portion. Essentially, the construction here illustrated does not require distortion of the hollow member 9; and if it is made reasonably stout and strong, no material distortion need occur.

The joint is much stronger than if the end of the tube 7 were split (either beforehand or in driving the plug 9); and the expansion and stretching of the tube in every direction by the plug also makes the connection stronger than if the tube were expanded in one diametral direction only, besides avoiding any tendency to distort the part 6. Splitting of the tube 7 would naturally, of course, nullify the effect of shrinking the part 6 on the tube.

It is also to be observed that it is preferable to ease off the points of the junction between the portions 8 and 8ª of the central opening in the metal part 6, so as not to leave any abrupt corners which would cause too much local distortion in the tube when expanded into place.

It will be noted that the hexagonal form given to the rear end of the recess in the metal part 6, besides preventing the tube from pulling out of the metal part, prevents relative rotation between the tube and the metal part, thus making the joint a rigid one. However, as before noted, I do not limit myself to this particular shape of an opening, any enlargement or irregular opening serving to accomplish the desired results coming within the purview of my invention, as defined herein.

I claim:

1. In the art of joining unsplit round metal tubing into an associated hollow metal part for torque transmission, the method which comprises forming such part with opening cylindrical to align such tubing and recessed to afford anti-turning engagement, and stretching and expanding the tube through its open end into anti-turning engagement in the recesses of said part while tube and part are kept in alignment as aforesaid.

2. The method for joining unsplit round metal tubing into an associated hollow metal part with opening cylindrical for a portion of its length to align such tubing and at one end flaringly enlarged and recessed to afford anti-turning engagement, which comprises stretching and expanding the tube into tight fit and into effective anti-turning engagement in the said end of said part while the tube and said part are kept in alignment as aforesaid.

3. The method for joining unsplit round metal tubing, for torque transmission, to an associated member with a round portion for aligning the tube and a larger non-circular portion, which comprises stretching and expanding the tube wall into anti-turning conformity to said latter portion between the same and a cooperating sustaining member by relative movement of said members in the axial direction of the tube, one inside and one out, while said tube and said first-mentioned member are kept in proper alignment as aforesaid, and leaving said sustaining member in place to maintain the engagement.

4. The method for joining unsplit round metal tubing, for torque transmission, into an associated hollow metal member, with opening round bored to align such tubing and enlarged at one end, which comprises forcing into the end of the tube, while kept aligned as aforesaid, a sustaining member presenting a form corresponding to the enlargement of said opening and thus stretching and expanding the tube in all directions, without rupture, into effective torque-transmitting engagement in said opening, and securing said member in place to sustain the tube wall as aforesaid.

5. The method for joining unsplit round metal tubing, for torque transmission, into a hollow metal part round bored to align such tubing and affording means for positive, eccentric anti-turning engagement therewithin, which comprises fitting the tube tight in the round bore of said member and forcing a sustaining member tight into the end of the tube to maintain it in effectual torque-transmitting contact with said bore and in positive, eccentric anti-turning engagement with said means.

6. A torque transmission device comprising a hollow metal part with round bore enlarged to non-circular cross section at one end, and an unsplit metal tube aligned in said bore with its end expanded into anti-turning engagement in the enlarged opening.

7. A torque-transmitting device comprising a member affording a non-circular cross section, a round metal tube with its wall deformed into anti-turning conformity to said member, and a cooperating member with corresponding configuration sustaining the tube wall in such engagement, one of said members being within and the other without the tube.

8. A torque-transmission device comprising a member with a round portion and a larger non-circular portion, a metal tube aligned by said round portion and expanded into anti-turning conformity to said non-circular portion, and a cooperating sustaining member for maintaining such engagement, one of said members being within and the other without the tube.

9. A torque-transmission device comprising a hollow member affording means for positive, eccentric anti-turning engagement therewithin, a metal tube in said member in such anti-turning engagement with said means, and a sustaining member in the tube maintaining such engagement.

10. In combination, a hub having a hole and a non-concentric recess, an unsplit tubular shaft extending into said hole having a portion forced into engagement with said recess, and a plug secured in the end of said shaft.

11. In combination, a hub having a hole and a non-concentric recess, a tubular shaft extending into said hole having a portion forced into engagement with said recess, and a plug secured in the end of said shaft, a plurality of said parts being welded together.

12. A torque-transmission device comprising a hollow metal member presenting a non-circular opening at one end, a metal tube in said opening, and an appropriately shaped plug forced into the end of the tube to expand and sustain it in anti-turning engagement in said opening.

13. A torque transmission device comprising a hollow member with opening round bored and also recessed to afford anti-turning engagement, an unsplit round metal tube tight in the round bore of said opening and having anti-turning engagement in its recesses, and a plug tight in the tube sustaining its wall tight against the round surface of said opening.

14. As a new article of manufacture, a torque transmission device comprising a substantially round tubular shaft, a spider member having a recessed portion of polygonal cross section adapted to receive the shaft, the end of the shaft being expanded thereinto, and a polygonal wedge in the said end of the shaft.

In testimony whereof, I have hereunto signed my name.

HARRY P. MACDONALD.